United States Patent [19]
Fitzpatrick

[11] Patent Number: 5,493,121
[45] Date of Patent: Feb. 20, 1996

[54] METHOD AND APPARATUS FOR MEASURING INCIDENT RADIATION

[75] Inventor: Brian J. Fitzpatrick, Ossining, N.Y.

[73] Assignee: Optical Semiconductors, Inc., Peekskill, N.Y.

[21] Appl. No.: 983,790

[22] Filed: Nov. 30, 1992

[51] Int. Cl.$^6$ ................................. G01T 1/20
[52] U.S. Cl. .................. 250/369; 250/361 R; 250/366
[58] Field of Search ........................ 250/369, 361 R, 250/366

[56] References Cited

U.S. PATENT DOCUMENTS 4,044,261  8/1977  Wilson ............................ 250/369

OTHER PUBLICATIONS

Woody, C. L., P. W. Levy, J. A. Kierstead, "Readout Techniques and Radiation Damage of Undoped Cesium Iodide", IEEE Nuclear Science Symposium, San Francisco, CA, 1989.

Primary Examiner—Carolyn E. Fields
Attorney, Agent, or Firm—David M. McConoughey

[57] ABSTRACT

A method and apparatus for measuring radiation are disclosed in which a scintillation body intercepts incident radiation to cause the body to emit a population of scintillation photons, the population of scintillation photons is spectrally decomposed into at least a first subpopulation of photons and a second subpopulation of photons (the first subpopulation originating from faster time decay processes than the second subpopulation) and at least one of the subpopulations is detected.

85 Claims, 3 Drawing Sheets

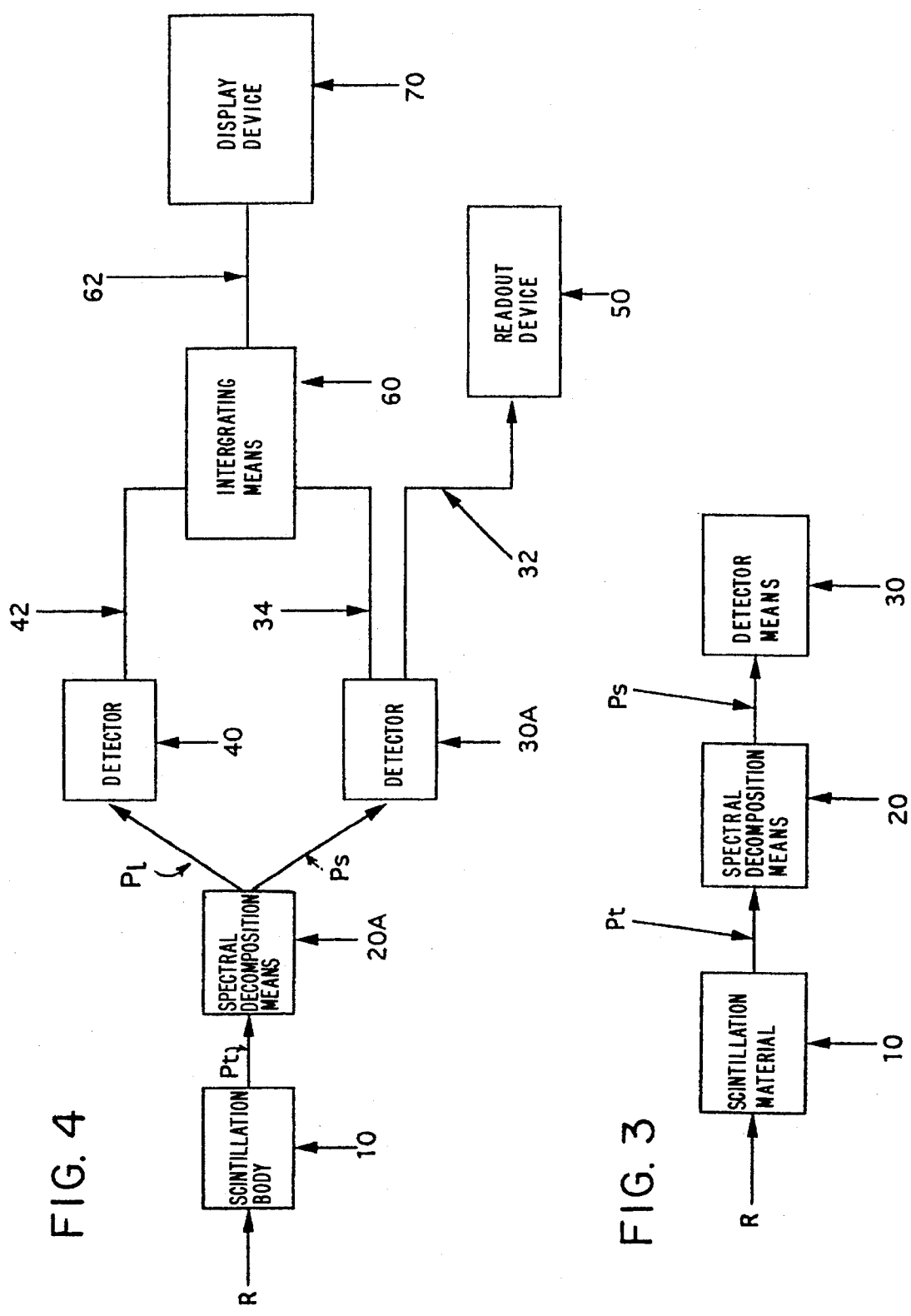

METHOD AND APPARATUS FOR MEASURING INCIDENT RADIATION

BACKGROUND OF THE INVENTION

The invention relates to measuring incident radiation by scintillation.

Zinc sulfide scintillation materials, while efficient in their conversion of incident radiation into scintillation photons, suffer from long decay times, i.e., decay times greater than 100 nanoseconds. In other words while these materials convert incident radiation into scintillation photons for measurement very efficiently (at an efficiency of at least 10%), they emit a significant number of these scintillation photons very slowly. For example, where the incident radiation is photons of electromagnetic radiation, the scintillation photons produced by an incident photon are produced a relatively long time after the incidence of the incident photon on the order of seconds. The relatively long decay time of zinc sulfide scintillation materials has been one of the factors discouraging their use in scintillation-based measurement devices.

SUMMARY OF THE INVENTION

It is an object of the invention to improve the detection of radiation through scintillation.

It is a further object of the invention to rapidly measure radiation using high efficiency scintillation materials, i.e., scintillation materials having at least about two percent (2%) efficiency and preferably ten percent (10%) efficiency.

It is a still further object of the invention to rapidly measure radiation using high efficiency scintillation materials while also having the capability of measuring total radiation.

In accordance with the invention a method and apparatus for measuring radiation is provided for improved detection of radiation as well as other advantages and in which a body of scintillation material intercepts incident radiation to cause the body to emit a population of scintillation photons, the population of scintillation photons is spectrally decomposed into at least a first subpopulation of photons and a second subpopulation of photons (the first subpopulation originating from faster time decay processes than the second subpopulation) and at least the subpopulation originating from faster time decay processes is detected.

BRIEF DESCRIPTION OF THE DRAWING

FIG. 3 is a schematic diagram of a first embodiment of the invention;

FIG. 4 is a schematic diagram of a second embodiment of the invention and

DESCRIPTION OF THE PREFERRED EMBODIMENT

Figure 1:
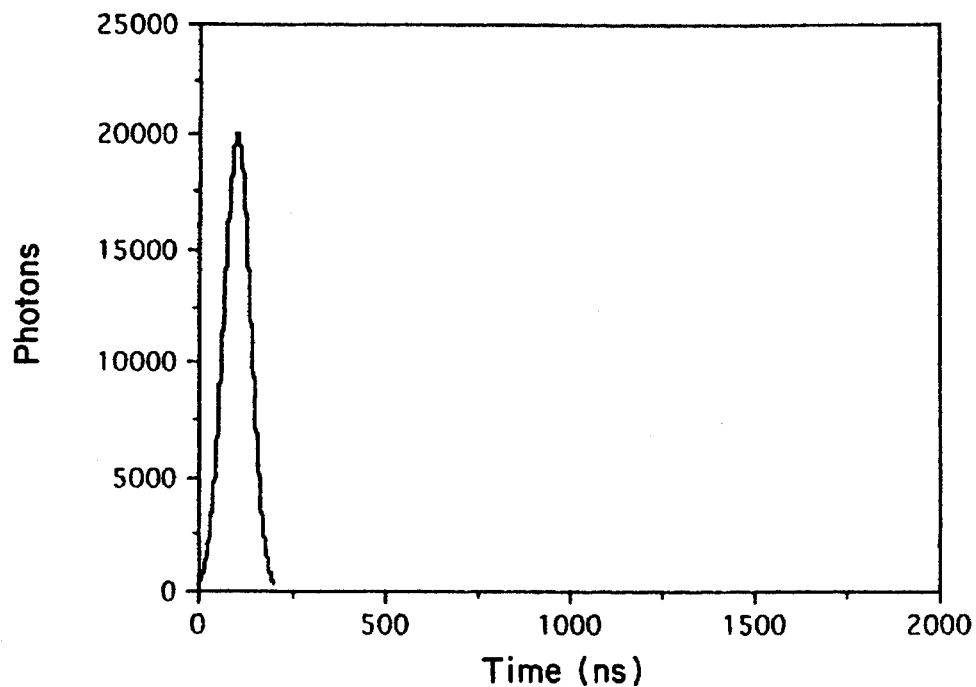
FIG. 1 is schematic representation of a graph of scintillation photon count rate expressed in photons versus time expressed in nanoseconds for scintillation photons having a wavelength of 515±5 nanometers.

In the invention incident radiation is measured by (a) intercepting it with a scintillation body and thereby causing the scintillation body to emit a population of scintillation photons, (b) spectrally decomposing the population of scintillation photons into at least a first subpopulation of photons and a second subpopulation of photons, the first subpopulation originating from faster time decay processes than the second subpopulation and (c) detecting the first subpopulation. Preferably, the first subpopulation has a shorter wavelength than the second subpopulation.

A suitable device for measuring incident radiation comprises (a) a scintillation body for intercepting incident radiation and emitting a population of scintillation photons; (b) a means for spectrally decomposing the population of scintillation photons into at least a first subpopulation of photons and a second subpopulation of photons, the first subpopulation originating from faster time decay processes than the second subpopulation, and (c) a detector for detecting the first subpopulation. In a preferred embodiment the first subpopulation has a shorter wavelength than the second subpopulation.

The incident radiation to be measured may be photons of electromagnetic radiation, such as X-rays, γ-rays, or particles, such as protons, fast neutrons (greater than 2 MEV), electrons, alpha particles and other subatomic particles that are capable of producing photons of electromagnetic radiation in a scintillation medium. Desirably, the emitted scintillation photons have a wavelength from about 200 to about 1500 nanometers and, preferably, from about 300 to about 900 nanometers.

The scintillation body is composed of scintillation material having time-dependent emission of scintillation photons—preferably a high efficiency scintillation material. The invention has particular application to a high efficiency scintillation (at least about 2% and preferrably at least about 10%) with time-dependent emissions of scintillation photons. The efficiency referred to here is energy conversion efficiency, or the efficiency with which the scintillation material converts incident radiation to scintillation photons from an energy standpoint. For example, if a scintillation material were to convert a single quantum of 0.1 MEV γ-ray radiation into 4,000 scintillation photons at 2.5 EV per photon for a total scintillation photon energy of 10 KEV, the scintillation material would have an efficiency of about ten percent (10%). In scintillation materials having time-dependent emissions of scintillation photons the scintillation photons produced by incident radiation are produced and emitted over a period of time after the incidence of the incident radiation; hence, they are time-dependent emissions. An artifact of this time-dependence is the afterglow that at least some scintillation materials exhibit. Time-dependent emissions can be viewed as decay processes, such that the scintillation photons emitted early in the time period originate from faster time decay processes than those emitted later.

The scintillation body is preferably a monolithic single body having a monocrystalline or polycrystalline morphology and is preferably transparent with respect to emitted scintillation photons. The material may be an interatomic material such as an alkali metal halide, e.g., sodium iodide, cesium iodide or cesium fluoride; bismuth germanium oxide ($Bi_4Ge_3O_{12}$); calcium tungstate ($CaWO_4$); barium fluoride; a rare earth orthosilicate such as gadolinium orthosilicate ($Gd_2SiO_5$) and lutetium orthosilicate ($Lu_2SiO_5$) or a Group II, VI compound (a "2,6 compound"), e.g., zinc sulfide, cadmium sulfide or zinc selenide. The preferred materials are the 2,6 compounds and of these zinc sulfide, cadmium sulfide or zinc selenide and mixtures thereof are preferred, with zinc sulfide being most preferable. Such materials may be doped with other elements to modify performance. In the case of zinc sulfide and zinc selenide, copper, silver and gold may be used as dopants.

Figure 2:
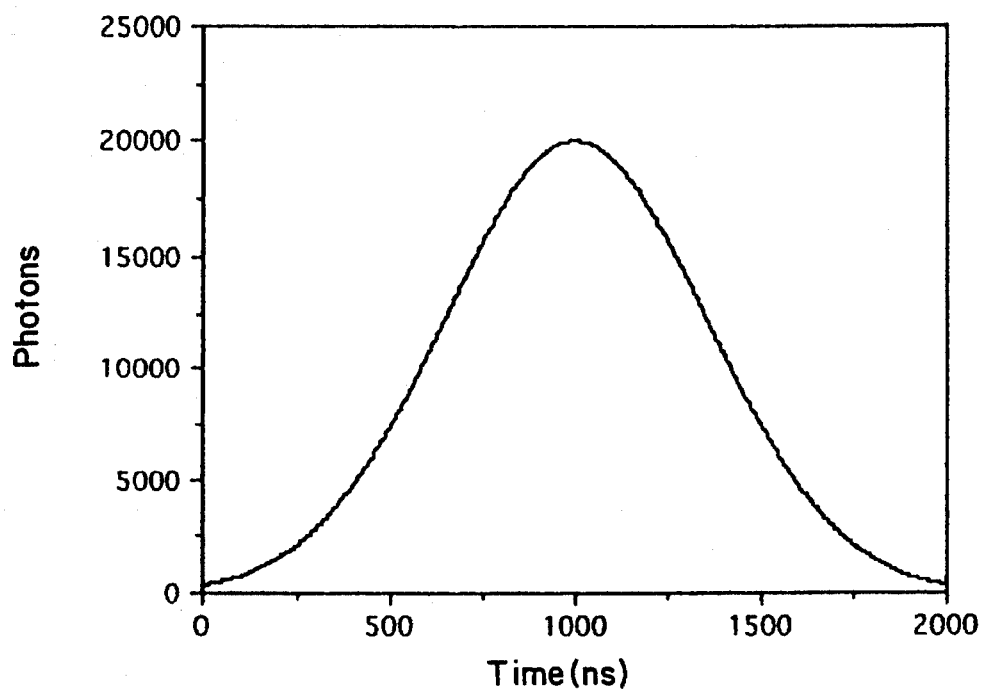
FIG. 2 is a schematic representation of a graph of scintillation photon count rate expressed in photons versus time expressed in nanoseconds for scintillation photons having a wavelength of 523±5 nanometers.

The incident radiation impinging on the scintillation material causes it to produce and emit scintillation photons of electromagnetic radiation. The wavelength at which the maximum amplitude of scintillation photons occurs varies with time such that the amplitude maximum starts at a short wavelength and shifts toward longer wavelengths as the time lapse between the incidence of radiation and the emission of scintillation photons gets longer. FIGS. 1 and 2 illustrate this shift of the spectral peak in an illustrative way. (FIGS. 1 and 2 are for illustrative purposes and are not intended to represent actual data.) In FIG. 1 the amplitude of scintillation photon emission at 515 nanometers is greatest at 100 nanoseconds. In FIG. 2 at 523 nanometers the maximum spectral peak has shifted to 1000 nanoseconds.

In the case of 2,6 group materials the scintillation material produces these scintillation photons by a donor-acceptor pair transition process. In this process incident radiation excites electrons of the scintillation material into a higher energy state. These excited electrons migrate through the lattice of the scintillation material until they become trapped on a donor atom. Photons are emitted when these electrons recombine with "holes" trapped on acceptor atoms. Donor atoms are not necessarily associated with corresponding acceptor atoms as immediately adjacent neighbors in the crystal lattice of the 2,6 group material. In fact, there are a plurality of interatomic distances between donor and acceptor sites. Therefore, the decay time varies in accordance with this distance and scintillation photons are emitted over a range of times. Decay is not a completely random statistical process due to the Coulombic attraction between each negatively charged electron and the positively charged holes in proximity to it. In other words, because of this Coulombic attraction, the more closely spaced donor-acceptor pairs exhibit more rapid recombination. Another consequence of the Coulombic attraction is that the energy of that attraction is incorporated into the emitted photon. Thus, photons emitted by closer pairs are higher in energy, and thus of shorter wavelength. By sampling for shorter wavelength scintillation photons it is possible to discriminate for the shorter decay time donor-acceptor pair transitions and to avoid the problem presented by the relatively long decay time that high efficiency time-dependent emission scintillation materials, such as 2,6 group scintillation materials, exhibit. The same approach applies to other scintillation materials that exhibit time-dependent emission of scintillation photons although the donor-acceptor pair transition process may not be the operative mechanism.

One way of sampling for shorter wavelength scintillation photons is to spectrally decompose the population of scintillation photons emitted by the scintillation material by wavelength to provide at least a subpopulation of shorter wavelength scintillation photons and, optionally, a subpopulation of longer wavelength scintillation photons. This shorter wavelength subpopulation is then detected. Owing to the shorter decay time of shorter wavelength scintillation photons, detection of this subpopulation of scintillation photons allows the more accurate resolution of pulses of incident radiation than if the entire output of the scintillation material over all wavelengths were detected. Because of the efficiency of 2,6 group materials, these materials are particularly useful since this technique can be used at lower count rates—even as low as single pulses. Whereas in the past the amplitude of the total output of scintillation photons emitted by a scintillation body as a result of incident radiation was measured over time, here only a selected wavelength or a selected wavelength range is measured over time. In fact, due to the significantly shorter decay time at these shorter wavelengths, there is essentially no delay time between incident event and output detection and it occurs essentially on a real time basis rather than on a time- average basis.

If desired, the subpopulation of longer wavelength scintillation photons can be detected for purposes of generating data that is integrated over time. In this way rate information can be obtained using the short wavelength subpopulation and total or integrated information can be obtained using the longer wavelength subpopulation. Information using only the longer wavelength subpopulation can also be used to supplement information from the shorter wavelength population where the count rate of the incident radiation is too low to provide adequate information using only the shorter wavelength population alone. In fact, the cutoff point between the shorter wavelength subpopulation and the longer wavelength subpopulation can be varied dynamically according to the count rate of incident radiation and the need for accuracy in the measurement.

The spectral decomposition of the population of scintillation photons is preferably accomplished with a spectral decomposition means, such as a filter, prism or diffraction grating. In selecting a subpopulation of shorter wavelength scintillation photons it is preferable to use a short wavelength pass filter, such as an interference filter available Model Nos. 03FIV038 (for copper-doped, zinc sulfide) or 03FIV028 (for silver-doped, zinc sulfide) available from Melles Griot (Irvine, Calif.). Alternatively, a monochromator can be used, such as Model MULTISPEC No. 77417 available from Oriel Corp. (Stratford, Conn.) In this way, the spectral decomposition means is set to cut off all radiation beyond a particular wavelength. In the case of copper-doped, zinc sulfide this might preferably be at about 520 nanometers or in the case of silver-doped, zinc sulfide it might preferably be at about 460 nanometers.

It is also possible to detect the subpopulation rejected by the short wavelength pass filter or short wavelength monochromator. This approach would provide (1) a fast signal derived from the shorter wavelength population for situations where there are high count rates and (2) a slow signal derived from the rejected longer wavelength population that could be used as a DC signal for high efficiency where there are low count rates. It is also possible to gather information about both signals to provide both an instantaneous readout and an integrated readout.

The spectral decomposition means can also be tunable so that the cutoff wavelength between the two subpopulations or the relative fraction of the shorter wavelength subpopulation could be varied. In other words, the cutoff wavelength between the two subpopulations and/or the relative proportion of the two subpopulations could be varied. An electro-optic tunable filter, Model No. LS-14 (Ithaco Research Corp., Ithaca, N.Y.), an acousto-optic tunable filter, or a liquid crystal birefringent filter could be used. If desired, the tunable filter means could be put into a servo-loop. The servo loop could be driven such that the output of scintillation photons to the detector is constant and the output signal of interest could be the movement of the cutoff wavelength of the filter means or it could be the cutoff wavelength itself.

The scintillation photons are detected by a detector such as a photomultiplier, a diode array, a charge coupled device or a vidicon. Suitable photomultipliers are available from Burle Industries (Lancaster, Pa.) as Model No. 931A. Suitable diode arrays are available from EG & G Reticon (Sunnyvale, Calif.) as Model No. RL0064 AAG-011. Suitable charge coupled devices are available from EG & G Reticon (Sunnyvale, Calif.) as Model No. RA 1200J. Suitable vidicon devices are available from Burle Industries (Lancaster, Pa.) as Model No. 8844.

Figure 5:
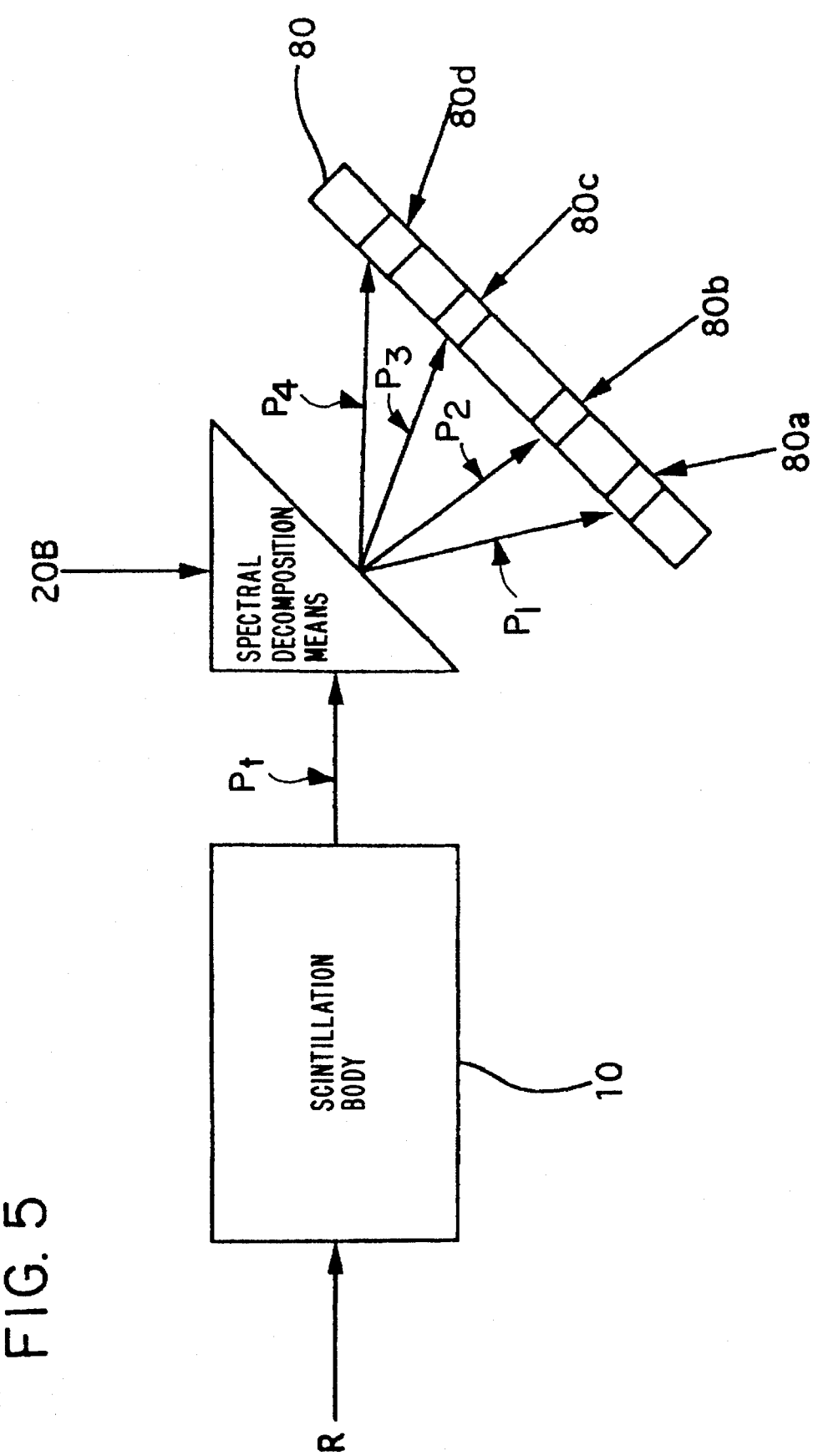
FIG. 5 is a schematic diagram of a third embodiment of the invention.

The detector is disposed to capture emitted scintillation photons and need only have the spectral decomposition means interposed between the scintillation body and itself so that the selected subpopulation of scintillation photons is detected. The advantage of using a diode array detector is that a spectral decomposition means can be used that not only spectrally decomposes the scintillation photon population, but also spatially disperses the respective subpopulations so that specific subpopulations are detected by a particular diode or diodes in the array assigned to that specific subpopulation. (FIG. 5 illustrates just such an approach.)

The number of emitted scintillation photons detected in the first subpopulation can be displayed, such as directly with a suitable readout device or, through mathematical manipulation, the total number of scintillation photons in the first subpopulation can be determined and, if desired, displayed. The same can be done with the second subpopulation and, for that matter, with any other spectrally decomposed subpopulation of scintillation photons, such as those discussed with regard to the embodiment illustrated in FIG. 5.

The amount of incident radiation can be determined mathematically from the detected scintillation photons by means known in the art. For example, if the total energy of the incident radiation per unit time is desired, it can be provided by dividing the total energy of the scintillation photon output per unit time (as derived from the detected scintillation photon characteristics) by the efficiency of the scintillation material. If the number of quanta of incident radiation per unit of time is desired, it can be provide by dividing the total energy of the incident radiation per unit time by the average energy per quantum of incident radiation.

Because of the efficiency of the scintillation materials used in the invention, the apparatus and method of the invention can be used for measuring merely the presence or absence of incident radiation by detecting the presence or absence of scintillation photons in the aforesaid manner using short wavelength scintillation photons.

FIG. 3 illustrates a first embodiment of the apparatus and related method of the invention in schematic form in which incident radiation R impinges on a body of scintillation material 10 causing the emission of a population of scintillation photons $P_t$. This population $P_t$, at least in part, impinges on a spectral decomposition means 20 that spectrally decomposes the population $P_t$ and, in this case, acts as a short wavelength pass filter and passes a subpopulation of scintillation photons $P_s$ of shorter wavelength, e.g., 520 nanometers or less. The subpopulation $P_s$, at least in part, impinges on a detector means 30 where it is detected. A suitable readout device (not shown) may be used to display the real time count rate, e.g., a value reflecting the number of shorter wavelength scintillation photons per unit time, and therefore to reflect the count rate of the incident radiation.

FIG. 4 illustrates a second embodiment of the apparatus and related method of the invention in schematic form which reflects the same apparatus and related method as FIG. 3 with respect to incident radiation R, scintillation body 10 and population $P_t$. In this embodiment the population $P_t$ is spectrally decomposed by spectral decomposition means 20A into a subpopulation $P_s$ of shorter wavelength scintillation photons and a subpopulation $P_l$ of longer wavelength photons. Detector 30A detects subpopulation $P_s$ and has two output signals. The first output signal 32 goes directly to a readout device 50 that displays a realtime count rate. The second output signal 34, passes to an integrating means 60. Subpopulation $P_L$ is passed to a second detector 40 such that longer wavelength scintillation photons are detected there. An output signal 42 from detector 40 is passed to the integrating means 60 where it is integrated with the output signal 34 from the short wavelength scintillation photon detector 30A to produce an output signal 62 that is indicative of the cumulative count rate. Signal 62 is passed to a suitable display device 70 that displays a readout of the average count rate of incident radiation R over time.

FIG. 5 illustrates a third embodiment of the apparatus and related method of the invention which is the same as the embodiment of FIG. 3 with respect to incident radiation R, scintillation body 10 and population $P_t$, except that spectral decomposition means 20B, in spectrally decomposing $P_t$, spatially disperses the subpopulations it produces (shown here for illustrative purposes as $P_1$, $P_2$, $P_3$, and $P_4$.) The spatially dispersed subpopulations ($P_1$, $P_2$, $P_3$ and, $P_4$) of population $P_t$ are detected by an array 80 of detectors (80a, 80b, 80c, 80d) such that each subpopulation is detected by an assigned detector. In this way a plurality of output signals are available that are each reflective of a specific corresponding wavelength or wavelength range. Consequently, count rates for individual wavelengths or wavelength ranges are available for combinations of individual wavelengths or for combinations of wavelength ranges.

The apparatus and method described are useful for well and bore hole logging; X-ray, γ-ray, positron and photon detection devices, such as those used for positron emission tomography (PET), single photon emission computed tomography (SPECT) and other tomographic processes; and nuclear medicine procedures, such as for brain, liver, thyroid and other organ scans.

While the present invention has been described with respect to certain particular embodiments thereof, it is apparent that numerous other forms and modifications of this invention will be obvious to those skilled in the art. The appended claims and this invention generally should be construed to cover all forms and modifications that are within the true spirit and scope of the present invention.

I claim:

1. A method of measuring incident radiation by scintillation comprising a. intercepting incident radiation with a body of scintillation material to thereby cause said body to emit a population scintillation photons, said material exhibiting time-dependent emission of scintillation photons;

b. spectrally decomposing the population of scintillation photons into at least a first subpopulation of photons and a second subpopulation of photons, the first subpopulation originating from faster time decay processes than the second subpopulation and c. detecting scintillation photons in the first subpopulation wherein the spectral decomposing spatially disperses at least the first and second subpopulations and the detecting comprises detecting scintillation photons in the first subpopulation at a point spatially dispersed from the point of detecting scintillation photons in the second subpopulation.

2. A method as defined by claim 1, wherein the first subpopulation is of shorter wavelength than the second subpopulation.

3. A method as defined by claim 2, wherein the scintillation material has an efficiency of at least two percent.

4. A method as defined by claim 2, wherein the scintillation material has an efficiency of at least ten percent.

5. A method as defined by claim 2, wherein the method further comprises a further step of d. determining the total number of scintillation photons in the first subpopulation based on the number of scintillation photons detected in the first subpopulation.

6. A method as defined by claim 2, wherein the method further comprises a further step of d. determining the amount of incident radiation based on the number of scintillation photons detected in the first subpopulation.

7. A method as defined by claim 2, wherein the method comprises a further step of d. detecting scintillation photons in the second subpopulation.

8. A method as defined by claim 7, wherein the method comprises a further step of e. integrating information from step c and information from step d.

9. A method as defined by claim 2, wherein the spectral decomposing spatially disperses at least the first and second subpopulations and the detecting comprises detecting scintillation photons in the first subpopulation at a point spatially dispersed from the point of detecting scintillation photons in the second subpopulation.

10. A method as defined by claim 2, wherein said body comprises a material selected from the group consisting of zinc sulfide, cadmium sulfide, zinc selenide and a mixture thereof.

11. A method as defined by claim 10, wherein said material is doped with a second material selected from the group consisting of copper, gold and silver.

12. A method as defined by claim 2, wherein said body comprises a material selected from the group consisting of copper-doped zinc sulfide and silver-doped zinc sulfide.

13. A method as defined by claim 2, wherein said spectral decomposition is performed by means selected from the group consisting of a filter, a prism, a diffraction grating, and a monochromator.

14. A method as defined by claim 2, wherein said first subpopulation has a wavelength of about 520 nanometers or less.

15. A method as defined by claim 2, wherein said first subpopulation has a wavelength of about 460 nanometers or less.

16. A method as defined by claim 2, wherein the step of spectral decomposition includes varying the relative proportion of the two subpopulations.

17. A method as defined by claim 2, wherein the step of detecting is performed by means selected from the group consisting of a photomultiplier, a charge coupled device, a photodiode, a diode-array detector or a vidicon.

18. A method as defined by claim 2, wherein the step of spectral decomposition is tunable with respect to wavelength.

19. A method as defined by claim 2, wherein the step of detecting detects scintillation photons having a wavelength of about 520 nanometers or less.

20. A method as defined by claim 2, wherein the step of spectral decomposing passes scintillation photons having a wavelength of about 520 nanometers or less.

21. A method as defined by claim 2, wherein the step of spectral decomposing rejects scintillation photons having a wavelength of about 520 nanometers or less.

22. A method as defined by claim 1 wherein said scintillation material exhibits time-dependent emission of scintillation photons by a donor-acceptor pair transition process.

23. A device for measuring incident radiation by scintillation comprising a. a body of scintillation material for intercepting incident radiation and emitting a population of scintillation photons, said material exhibiting time dependent emission of scintillation photons;

b. a spectral decomposition means for spectrally decomposing the population of scintillation photons into at least a first subpopulation of photons and a second subpopulation of photons, the first subpopulation originating from faster time decay processes than the second subpopulation;

c. first detector means for detecting scintillation photons in the first subpopulation and d. second detector means for detecting scintillation photons in the second subpopulation.

24. A device as defined by claim 23, wherein the first subpopulation is of shorter wavelength than the second subpopulation.

25. A device as defined by claim 24, wherein the scintillation material has an efficiency of at least two percent.

26. A device as defined by claim 24, wherein the scintillation material has an efficiency of at least ten percent.

27. A device as defined by claim 24, wherein the apparatus further comprises d. means for determining the total number of scintillation photons in the first population based on the number of scintillation photons detected in the first subpopulation.

28. A device as defined by claim 24, wherein the device further comprises d. means for determining the amount of incident radiation based on the number of scintillation photons detected in the first subpopulation.

29. A device as defined by claim 24, wherein the spectral decomposition means spatially disperses at least the first and second subpopulations and the first detector means comprises at least a first detector and a second detector that are spatially dispersed frown each other and scintillation photons in the first subpopulation are detected by the first detector and scintillation photons in the second subpopulation are detected by the second detector.

30. A device as defined by claim 24, wherein said scintillation body comprises a material selected from the group consisting of zinc sulfide, cadmium sulfide, zinc selenide and a mixture thereof.

31. A device as defined by claim 30, wherein said material is doped with a second material selected from the group consisting of copper, gold and silver.

32. A device as defined by claim 24, wherein said scintillation body comprises copper-doped zinc sulfide or silver-doped zinc sulfide.

33. A device as defined by claim 24 wherein said spectra/decomposition means comprises means selected from the group consisting of a filter, a prism, a diffraction grating, and a monochromator.

34. A device as defined by claim 33 wherein said filter is selected from the group consisting of a birefringent filter a short wavelength pass filter, an acousto-optical filter, an electro-optical filter and a liquid crystal birefringent filter.

35. A device as defined by claim 24, wherein said first subpopulation has a wavelength of about 520 nanometers or less.

36. A device as defined by claim 24, wherein said first subpopulation has a wavelength of about 460 nanometers or less.

37. A device as defined by claim 24, wherein the spectral decomposition means varies the relative proportion of the two subpopulations.

38. A device as defined by claim 24, wherein said first and second detector means comprise means selected from the group consisting of a photomultiplier, a charge coupled device, a photodiode, a diode-array detector, and a vidicon.

39. A device as defined by claim 24, wherein said spectral decomposition means is tunable with respect to wavelength.

40. A device as defined by claim 24, wherein the first detector detects scintillation photons having a wavelength of about 520 nanometers or less.

41. A device as defined by claim 24, wherein said spectral decomposition means passes scintillation photons having a wavelength of about 520 nanometers or less.

42. A device as defined by claim 24, wherein said spectral decomposition means rejects scintillation photons having a wavelength of about 520 nanometers or less.

43. A device as defined by claim 23, wherein the device comprises
   e. means for integrating information from the first detector means and information from the second detector means.

44. A device as defined by claim 23 wherein said scintillation material exhibits time-dependent emission of scintillation photons by a donor-acceptor pair transition process.

45. A method of measuring incident radiation by scintillation comprising
   a. intercepting incident radiation with a body of scintillation material to thereby cause said body to emit a population of scintillation photons, said material exhibiting time-dependent emission of scintillation photons;
   b. spectrally decomposing the population of scintillation photons into at least a first subpopulation of photons and a second subpopulation of photons, the first subpopulation originating from faster time decay processes than the second subpopulation and being of shorter wavelength than the second subpopulation; and
   c. detecting scintillation photons in the first subpopulation wherein
   the spectral decomposing spatially disperses at least the first and second subpopulations and the detecting comprises detecting scintillation photons in the first subpopulation at a point spatially dispersed from the point of detecting scintillation photons in the second subpopulation.

46. A method as defined by claim 45 wherein said scintillation material exhibits time-dependent emission of scintillation photons by a donor-acceptor pair transition process.

47. A method as defined by claim 45 wherein the scintillation material has an efficiency of at least two percent.

48. A method as defined by claim 45 wherein the scintillation material has an efficiency of at least ten percent.

49. A method as defined by claim 45 wherein the method further comprises a further step of
   d. determining the total number of scintillation photons in the first subpopulation based on the number of scintillation photons detected in the first subpopulation.

50. A method as defined by claim 45 wherein the method further comprises a further step of
   d. determining the amount of incident radiation based on the number of scintillation photons detected in the first subpopulation.

51. A method as defined by claim 45 wherein the method comprises a further step of
   d. detecting scintillation photons in the second subpopulation.

52. A method as defined by claim 51 wherein the method comprises a further step of
   e. integrating information from step c and information from step d.

53. A method as defined by claim 45 wherein said body comprises a material selected from the group consisting of zinc sulfide, cadmium sulfide, zinc selenide and a mixture thereof.

54. A method as defined by claim 53 wherein said material is doped with a second material selected from the group consisting of copper, gold and silver.

55. A method as defined by claim 45 wherein said body comprises a material selected from the group consisting of copper-doped zinc sulfide and silver-doped zinc sulfide.

56. A method as defined by claim 45 wherein said spectral decomposition is performed by means selected from the group consisting of a filter, a prism, a diffraction grating, and a monochromator.

57. A method as defined by claim 45 wherein said first subpopulation has a wavelength of about 520 nanometers or less.

58. A method as defined by claim 45 wherein said first subpopulation has a wavelength of about 460 nanometers or less.

59. A method as defined by claim 45 wherein the step of spectral decomposition includes varying the relative proportion of the two subpopulations.

60. A method as defined by claim 45 wherein the step of detecting is performed by means selected from the group consisting of a photomultiplier, a charge coupled device, a photodiode, a diode-array detector and a vidicon.

61. A method as defined by claim 45 wherein
the step of spectral decomposition is tunable with respect to wavelength.

62. A method as defined by claim 45 wherein the step of detecting detects scintillation photons having a wavelength of about 520 nanometers or less.

63. A method as defined by claim 45 wherein
the step of spectral decomposing passes scintillation photons having a wavelength of about 520 nanometers or less.

64. A method as defined by claim 45 wherein
the step of spectral decomposing rejects scintillation photons having a wavelength of about 520 nanometers or less.

65. A device for measuring incident radiation by scintillation comprising
  a. a body of scintillation material for intercepting incident radiation and emitting a population of scintillation photons, said material exhibiting time dependent emission of scintillation photons;
  b. a spectral decomposition means for spectrally decomposing the population of scintillation photons into at least a first, subpopulation of photons and a second subpopulation of photons, the first subpopulation originating from faster time decay processes than the second subpopulation and the first subpopulation being of shorter wavelength than the second subpopulation;
  c. first detector means for detecting scintillation photons in the first subpopulation and
  d. second detector means for detecting scintillation photons in the second subpopulation.

66. A device as defined by claim 65 wherein said scintillation material exhibits time-dependent emission of scintillation photons by a donor-acceptor pair transition process.

67. A device as defined by claim 65 wherein
the scintillation material has an efficiency of at least two percent.

68. A device as defined by claim 65 wherein
the scintillation material has an efficiency of at least ten percent.

69. A device as defined by claim 65 wherein the apparatus further comprises
  d. means for determining the total number of scintillation photons in the first population based on the number of scintillation photons detected in the first subpopulation.

70. A device as defined by claim 65 wherein the device further comprises
  d. means for determining the amount of incident radiation based on the number of scintillation photons detected in the first subpopulation.

71. A device as defined by claim 65 wherein the device comprises
  e. means for integrating information from the first detector means and information from the second detector means.

72. A device as defined by claim 65 wherein the spectral decomposition means spatially disperses at least the first and second subpopulations and the first detector means comprises at least a first and a second detector that are spatially dispersed from each other and scintillation photons in the first subpopulation are detected by the first detector and scintillation photons in the second subpopulation are detected by the second detector.

73. A device as defined by claim 65 wherein
said scintillation body comprises a material selected from the group consisting of zinc sulfide, cadmium sulfide, zinc selenide and a mixture thereof.

74. A device as defined by claim 73 wherein
said material is doped with a second material selected from the group consisting of copper, gold and silver.

75. A device as defined by claim 65 wherein
said scintillation body comprises copper-doped zinc sulfide or silver-doped zinc sulfide.

76. A device as defined by claim 65 wherein
said spectral decomposition means comprises means selected from the group consisting of a filter, a prism, a diffraction grating, and a monochromator.

77. A device as defined by claim 76 wherein
said filter is selected from the group consisting of a birefringent filter a short wavelength pass filter, an acousto-optical filter, an electro-optical filter and a liquid crystal birefringent filter.

78. A device as defined by claim 65 wherein
said first subpopulation has a wavelength of abut 520 nanometers or less.

79. A device as defined by claim 65 wherein
said first subpopulation has a wavelength of abut 460 nanometers or less.

80. A device as defined by claim 65 wherein
the spectral decomposition means varies the relative proportion of the two subpopulations.

81. A device as defined by claim 65 wherein
said first and second detector means comprise means selected from the group consisting of a photomultiplier, a charge coupled device, a photodiode a diode-array detector, and a vidicon.

82. A device as defined by claim 65 wherein
said spectral decomposition means is tunable with respect to wavelength.

83. A device as defined by claim 65 wherein
the detector means detects scintillation photons having a wavelength of about 520 nanometers or less.

84. A device as defined by claim 65 wherein
said spectral decomposition means passes scintillation photons having a wavelength of about 520 nanometers or less.

85. A device as defined by claim 65 wherein said spectral decomposition means rejects scintillation photons having a wavelength of about 520 nanometers or less.

* * * * *